March 13, 1928.
L. A. BROWN
TIRE
Filed May 14, 1924     2 Sheets-Sheet 1
1,662,599
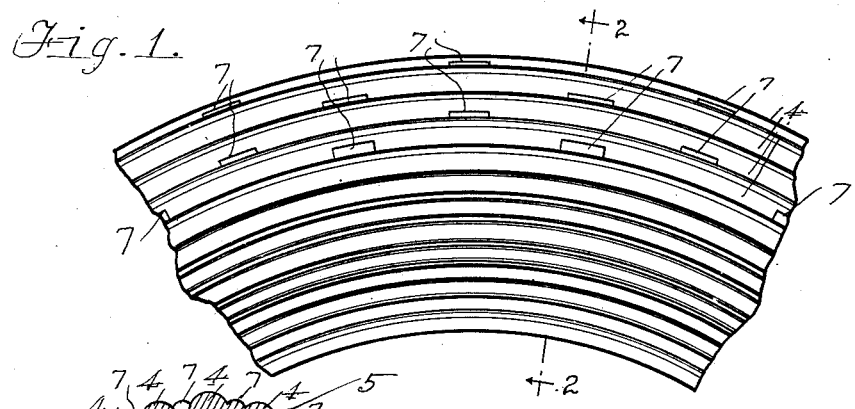
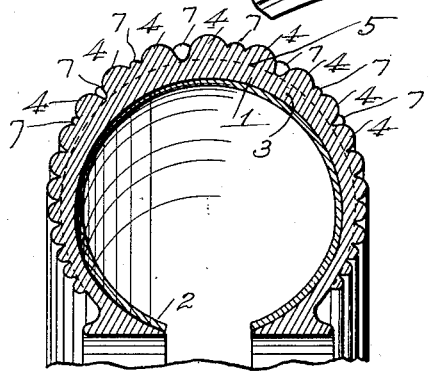
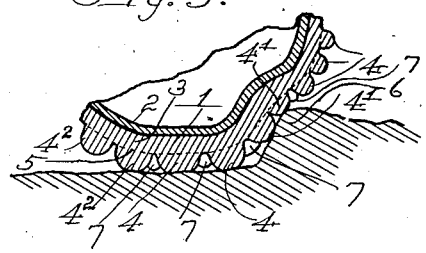
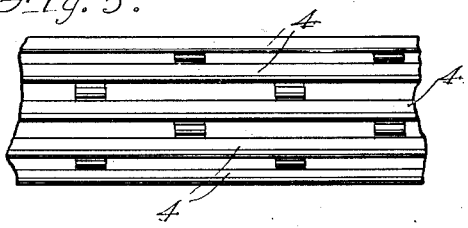
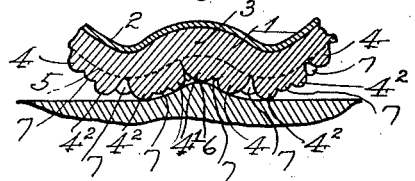
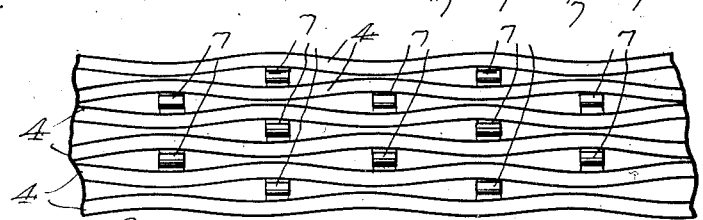
Witness: Geo L Chapel
Inventor: Liz Adam Brown
by Cyrus W. Rice
Attorney.

March 13, 1928.

L. A. BROWN

TIRE

Filed May 14, 1924

Witness:
Geo. L. Chapel

Inventor:
Liz Adam Brown
by Cyrus W. Rice
Attorney.

Patented Mar. 13, 1928.

1,662,599

UNITED STATES PATENT OFFICE.

LZ ADAM BROWN, OF ALTO, MICHIGAN, ASSIGNOR TO CORDUROY TIRE COMPANY, OF GRAND RAPIDS, MICHIGAN, A CORPORATION OF DELAWARE.

TIRE.

Application filed May 14, 1924. Serial No. 718,243.

The present invention relates to tires, and more particularly to "balloon" tires for automobiles and the like; and its object is, generally, to provide a tire improved in certain respects hereinafter appearing; and, more particularly, to provide such a tire having spaced circumferentially-extending resilient ribs with cross-members therebetween so disposed as to cause such portions of the ribs which contact the road surface to assume a non-parallel interrelation and thus augment the tractive efficiency of the tire; and further, to provide such a tire having a flexible body and like ribs extending outwardly therefrom, the body being thus sufficiently flexible to cause the ribs in the flexed area of the tire to approach each other by such flexing resulting from thrusts from without.

This and any other objects hereinafter appearing are attained by, and the invention finds preferable embodiment in, the tire structure hereinafter particularly described in the body of this specification and illustrated by the accompanying drawings, in which:—

Figure 1 is a side view of a portion of a tire;

Figure 2 is a cross-sectional view thereof taken on line 2—2 of Figure 1;

Figure 3 is a cross sectional view of a portion of the tire showing the same flexed inwardly by contact with a projection in the road;

Figure 4 is a similar cross-sectional view of the tire thus flexed in another place;

Figure 5 is a view of the tread portion of the tire, developed;

Figure 6 is a like view of the same, showing the ribs thereof in positions into which they have been flexed by contact with the road;

Figure 8:
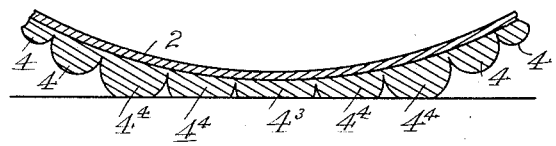
Figure 8 is a like view of the same in contact with the road.

The tire shown in the drawings is the "casing" portion of a pneumatic tire for automobiles. This tire has a flexible body 1, comprising a fabric inner part 2 and a rubber outer part 3. The tire has also a plurality of spaced resilient ribs 4 (integral with the rubber part 3) extending circumferentially of the tire and outwardly from its body 1, i. e. outwardly from the dotted line 5 appearing on the cross-sectional views. This body 1 is sufficiently flexible that it may be flexed inwardly by such thrusts from without as may be caused by the tire—in the automobile's travel—striking a projection 6 in the road, as illustrated in Figures 3 and 4. This inward flexing of the body 1 causes the ribs in the tire's flexed area to approach each other and assume the positions of the ribs $4^1$ in Figures 3 and 4. By this approaching movement, adjacent ribs in the flexed area are brought so near each other (or into contact with each other) that the force of the inward thrust is particularly well cushioned and the tire is enabled to better resist the same and to resist injury therefrom.

When however the body 1 of the tire returns to normal shape, or is flexed oppositely, the ribs—as the ribs $4^2$—recede from each other, as shown in said views. The result of this formation of the tire with a body 1 sufficiently flexible for said purpose, and with the spaced circumferential ribs 4, is thus to make possible a tire having a minimum amount of rubber tread and yet a sufficient capability of resisting the jars and jolts resulting from encountering projections in the road, and a greater capability of resisting wear and tear.

As shown, the tire has spaced apart resilient cross members 7 between adjacent ribs 4, the cross members on one side of each rib being in "staggered" relation to the cross members on the opposite side thereof, as particularly shown in Figures 5 and 6. The normal interrelative position of the ribs and cross members is seen in Figure 5; but said parts, when in contact with the road surface, assume (by the weight of the load carried thereby) the interrelative positions seen in Figure 6; that is, the resilient ribs are, by the cross members, forced into positions non-parallel with each other. It will be seen that in this non-parallel relation, the tractive efficiency of the tire is augmented.

It will be understood that so-called "balloon" tires, having as they do a thinner fabric inner part 2 than ordinary pneumatic tires have, and carrying less air-pressure therein, are more readily flexed in the manner and for the purposes above described than such ordinary tires can be. The provision of the circumferentially extending parallel ribs 4 not only at the sides of the tread portion of the tire, but also throughout the tread portion as well, peculiarly well adapts the tire shown in the views to the flexing operation and effect thereof above set forth; moreover, there is no such distortion in a tire having such a ribbed formation as exists in tires having such ribs broken into parts by intervening recesses and the like.

Figure 7:
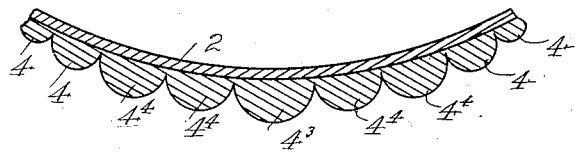
Figure 7 is a cross-sectional view of a portion of a tire, showing a modified construction thereof.

In Figures 7 and 8 is shown a modified form of the tire. In these views, the ribs (as in other views) are in cross-section approximately segments of circles. The middle rib $4^3$ is of greater cross-sectional dimensions than the others, and at each side thereof are a pair of ribs $4^4$. $4^4$ of less cross-section dimensions than the middle rib. All these ribs $4^4$ are approximately of the same cross-sectional dimensions. Normally these five ribs $4^3$ and $4^4$ are the ones which contact the road, as seen in Figure 8. As such ribs are squeezed or pressed toward each other in the lower part of the tire in contact with the road, and recede from each other as the wheel rolls to carry them out of contact with the road, these ribs are somewhat worn and abraded by their sidewise slipping movement on the road. I have found that such sidewise slipping movement is lessened by forming the pairs $4^4$ of approximately equal cross-sectional dimensions, as shown in Figures 7 and 8.

I claim:

In a low pressure tire having a carcass of greater flexibility than the carcass of a high pressure tire for the same load and adapted to carry a predetermined load at an inflation pressure substantially reduced below that of a high pressure tire for the same load, said tire being substantially increased in cross sectional area and decreased in ratio of wall thickness to cross sectional area with respect to a high pressure tire for the same load, the combination of a relatively thick tread sub-divided by grooves proportioned with respect to the increased flexibility of the carcass and the thickness of the tread to be closed by the greater flexing of the carcass under normal loading to present a substantially solid tread surface to the road under normal load and without detrimental friction to the carcass.

In testimony whereof I have hereunto set my hand at Grand Rapids, Michigan, this 10th day of May, 1924.

LZ ADAM BROWN.